J. MOORE.

Assignor of half interest to F. SMITH.

Joint for Sheet-Metal Pipes.

No. 8,214. Reissued May 7, 1878.

Witnesses

Geo. H. Strong.

Frank A. Brooks

Inventor

Joseph Moore by Dewey & Co.

Attys

N. PETERS, PHOTO-LITHOGRAPHER, WASHINGTON, D. C.

UNITED STATES PATENT OFFICE.

JOSEPH MOORE, OF SAN FRANCISCO, CALIFORNIA, ASSIGNOR OF ONE-HALF INTEREST TO FRANCIS SMITH.

IMPROVEMENT IN JOINTS FOR SHEET-METAL PIPES.

Specification forming part of Letters Patent No. 159,439, dated February 2, 1875; Reissue No. 8,214, dated May 7, 1878; application filed April 1, 1878.

*To all whom it may concern:*

Be it known that I, JOSEPH MOORE, of the city and county of San Francisco, and State of California, have invented an Improved Pipe-Joint for Sheet-Metal Water-Pipes; and I do hereby declare the following to be a full, clear, and exact description thereof, reference being had to the accompanying drawings, in which—

Figure 1:
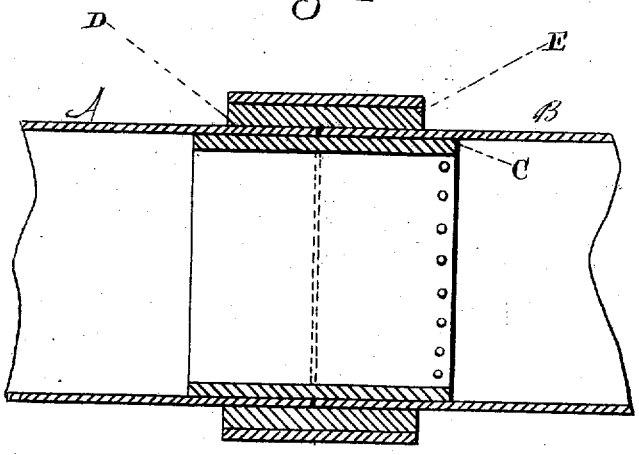
Figure 1:
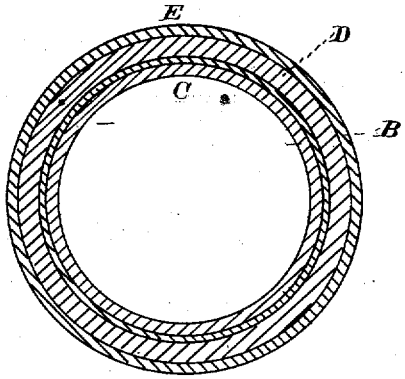

Figure 1 is a longitudinal section of a portion of pipe, showing the joint; and Fig. 2 is a transverse section.

Similar letters of reference indicate the same parts.

Heretofore sheet-iron water-pipes have been connected or jointed either by means of flanges riveted on each end of the pipe-sections and bolted together, or by means of bell-joints riveted into the end of one section, into which the plain end of the other section is inserted, and the joint packed with lead, in the same manner as is ordinarily done with cast-iron pipes. The latter method, being the cheapest, has been often tried, and, for light water-pressures, is to a certain extent successful; but the pressure of the water in the pipe, acting upon the surface of the lead in a line with the length of the pipe, usually expels the lead packing from the joint and causes the joint to leak.

It was to overcome this defect in this class of pipes that my invention was made, and, after the most thorough course of practical experiment and trial, it is found to be completely successful.

My invention consists in connecting the meeting ends of the pipes firmly together and placing a band or tube around the outside of the meeting ends, which is larger in diameter than the pipes, and which is long enough to extend a distance on each side of the joint, and then filling the space between the outside band or tube and the ends of the pipes with a packing of lead or other soft metal, either by tamp-it in or casting, as preferred.

Referring to the accompanying drawings, A and B are two sections or lengths of sheet-iron water-pipe, which are brought together to form a joint. C is the inside ring, usually made of sheet-iron of sufficient thickness to withstand the pressure caused by calking or tamping the lead. This ring is fastened to the end of one of the pipe-sections by rivets, which hold it in place, or by other suitable means, and the end of the other section is usually shoved over it. The ring is ordinarily from four to five inches wide, (longitudinally of the pipe,) and one number thicker than the iron of which the pipe is made. E is the outer band or section of tubing, made from three and one-half to five inches wide, usually about two numbers thicker than the iron of which the pipe is made, and about from three-fourths to seven-eighths of an inch larger in internal diameter than the outside of the pipe. D is the lead packing or joint, extending continuously from one side of the band E to the other, and made by pouring the lead into the space between E and A B, and calking or tamping it firmly into said space in the manner usual with cast-iron pipes, as above set forth.

I am aware of the state of the art in the construction of joints for pipes of paper, cement, cast-iron, and other similar materials; nor do I claim, broadly, the use of any one of the materials herein referred to for the manufacture of pipe-joints; but

What I claim as new, and desire to secure by Letters Patent, is—

A joint for connecting the ends of sheet-iron pipes together, consisting of the section A or B, provided with a flange, C, in combination with the opposite section, the surrounding band E, and packing D, for the purpose described.

In witness whereof I have hereunto set my hand and seal.

JOSEPH MOORE. [L. S.]

Witnesses:
GEO. CUMMING,
JNO. M. TAYLOR.